Patented Oct. 13, 1925.

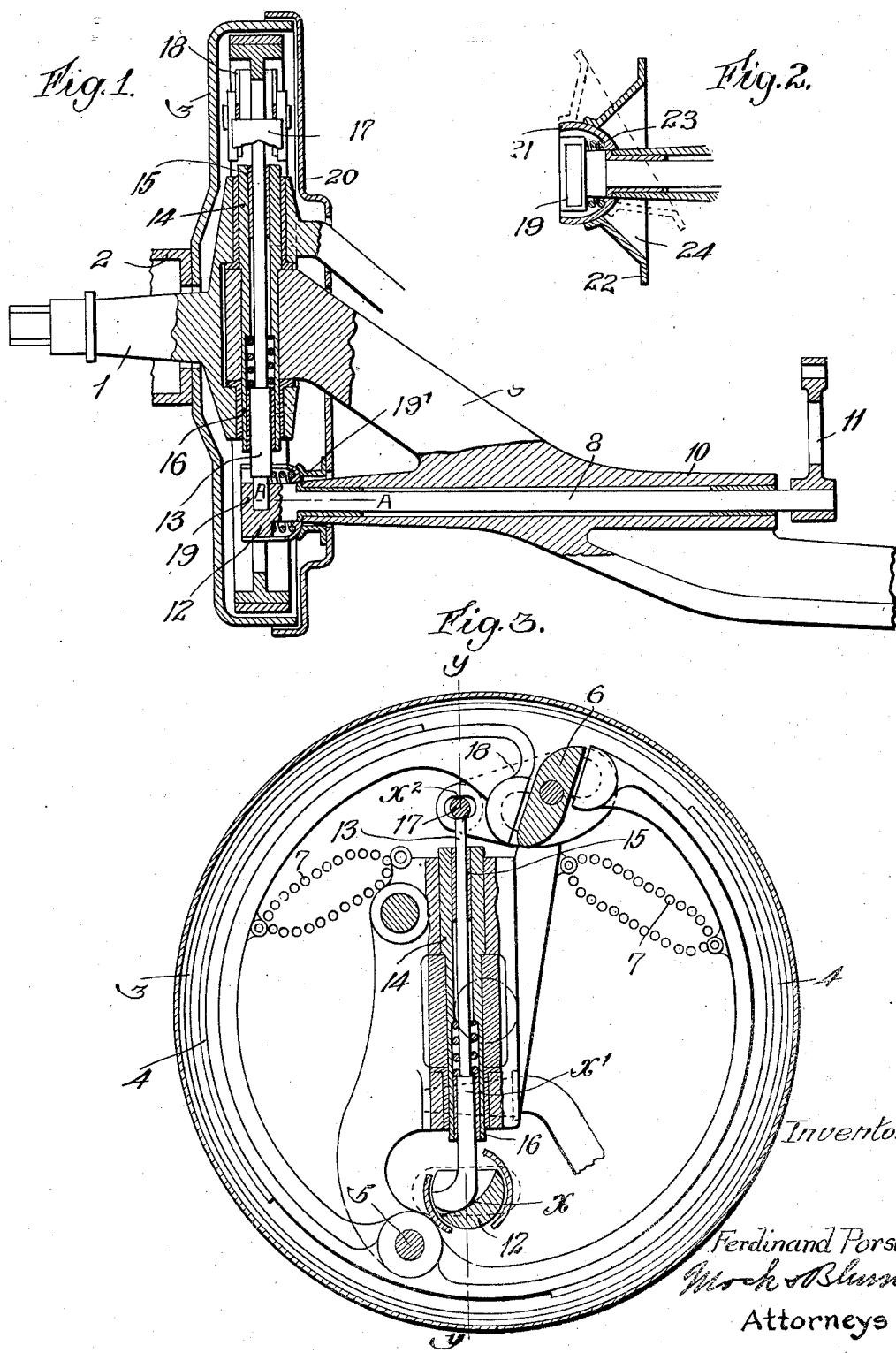

1,557,325

UNITED STATES PATENT OFFICE.

FERDINAND PORSCHE, OF STUTTGART-UNTERTURKHEIM, GERMANY, ASSIGNOR TO THE FIRM DAIMLER-MOTOREN-GESELLSCHAFT, OF STUTTGART-UNTERTURKHEIM, GERMANY.

STEERING-WHEEL BRAKE MECHANISM FOR MOTOR VEHICLES.

Application filed March 14, 1925. Serial No. 15,691.

*To all whom it may concern:*

Be it known that I, FERDINAND PORSCHE, a citizen of the Republic of Czechoslovakia, residing at Stuttgart-Unterturkheim, Wurtemberg, Germany, Mercedesstrasse 53, have invented certain new and useful Improvements in Steering-Wheel Brake Mechanism for Motor Vehicles, of which the following is a specification.

The invention relates to brake mechanism, and is intended for application primarily to the steering road-wheels of motor vehicles, in which the transmission of the braking moment or braking force to the brake is effected through a brake shaft mounted in the wheel axle to a thrust rod displaceably mounted in the hollow steering swivel journal.

The invention differs from the known steering wheel brakes of this type in that the brake shaft is mounted in a longitudinal bore in the wheel axle outside the bearing for the steering swivel journal, and acts on the thrust rod through a cam arranged outside the bearing for the steering swivel journal; and further in that the axes of the thrust rod and brake shaft are situated in the same plane.

In a steering-wheel brake according to the invention, the cam transmitting the braking effort from the brake shaft to the thrust rod has laterally projecting parallel walls forming a guide, between which engages the bent end of the thrust rod.

Further, according to the invention, the brake shaft rotatably mounted in the front axle is packed or engaged against the cover plate of the brake by a spring-loaded ball socket.

A steering-wheel brake according to the invention affords several advantages.

Owing to the brake shaft and thrust rod being situated in the same plane no rocking levers are required for transmitting the braking moment or effort from the brake shaft to the thrust rod. Consequently, when the wheels are swung around there is no shifting of the brakes, which, in the case of lever mechanism, can only be avoided by complicated devices. Moreover, the arranging of the brake shaft inside the body of the axle itself presents the advantage that the otherwise necessary members for supporting the brake shaft are dispensed with, the manufacture being consequently simplified and the cost of production reduced.

On the other hand, owing to the brake shaft lying outside the bearing of the steering swivel journal, the interior of the drum can be effectually closed in a simple manner.

No parts capable of rendering the closing of the drum difficult and necessitating the adoption of troublesome measures are situated in the middle of the drum. A tight closure that is not liable to be impaired by the presence of complicated devices is, however, an esesntial condition for efficient braking and the prevention of premature wear of individual parts through the penetration of dust.

In the drawing, a typical embodiment of the invention is illustrated by three figures:—

Figure 1 shows a vertical section through the brake drum, steering swivel and adjacent parts. Figure 2 shows a horizontal section along the line A—A of Figure 1. Figure 3 shows a side elvation of the brake mechanism in partial section.

The hub 2 of the wheel (not shown) is mounted on the journal 1 of the steering swivel in the usual manner, and on this hub is attached the brake drum 3. The brake consists, for example, as shown in Figure 3, of the two brake cheeks 4, which are retained by pivot pins 5. Between the two brake cheeks is arranged a cam 6, which serves in known manner to force the brake cheeks 4 apart and thus press them against the brake drum 3. In this movement of the cam, the springs 7 are placed under tension, and when the cam has been returned to its former position, the pull of the springs draws the brake cheeks away from the drum 3.

The device provided, according to the invention, for acting on the brake, is constituted as follows:—

The cross shaft 8, which is mounted in a bore 10 in the road wheel axle 9, carries on its one end for example a lever 11, to which is attached a rod (not shown) leading to the hand lever. On the other end of the cross shaft is situated a cam 12, which turns with said shaft. Against the cam 12 bears a small rod 13, which passes through the hollow portion 14 of the steering swivel 1 and is mounted in a technically perfect manner in the bushes 15, 16. The lubricant for the rod 13 is preferably admitted between the two bearing points, thus producing good and reliable lubrication. On the side away from the cam, the rod 13 is connected, by a link 17, with the lever 18 which turns the cam 6 to press the brake cheeks aginst the brake drum.

As can be seen from Figure 1, the cam 12 is provided with projecting lateral lugs 19, which engage between them the small rod 13 so that the latter cannot turn.

As is principally shown by Figure 3 the axial centre $x$ of the cross shaft 8 and of the cam 12 mounted thereon, and also the axis $x^1$ of the rod 13 and the centre $x^2$ of the pivotal point 17, are situated on the pivotal axis $y$—$y$ of the steering swivel. As the result of such arrangement of the parts, these latter are not moved out of their original position when the wheel is turned in steering, and consequently the usual intermediate links are dispensed with. Moreover, the parts themselves can be conveniently arranged and simplified, so that a further considerable advantage in point of reliability in operation is obtained.

The invention also provides a simple method of closure for the gap $19^1$ in the guard plate 20. A ball socket 21 is mounted in a non-rotatable manner on the cross shaft 8, and bears against a correspondingly shaped member 22, attached to the guard plate, under the pressure of a spring 23. To enable the road wheel to swing in relation to the fixedly mounted cross shaft 8, a suitable transverse slot 24, closely covered by the ball socket, is provided in the guard plate. The position taken up by the guard plate in relation to the ball socket during the steering movement of the wheel is indicated by dotted lines in Figure 2.

Claims:—

1. In combination with an axle of an automobile having a hollow portion and having a steering wheel turnably connected thereto by a journal member, a brake drum associated with said steering wheel, brake members pivotally connected to said steering wheel and located within said brake drum, a cam turnably connected to said steering wheel and adapted to force the brake members associated with said steering wheel outwardly against the inner surface of the said brake drum, a rod slidably located within said journal member and connected to the said cam, a brake-actuating shaft located within the said hollow portion of said axle and having its ends projecting beyond the said hollow portion, an actuating member connected to that end of said shaft which is furthest from said steering wheel, the end of the said brake-actuating shaft which is adjacent said wheel having a cam adapted to co-operate with the said slidable rod to actuate the first mentioned cam, a spring associated with said slidable rod and adapted to force it into a position in which the associated brake mechanism is inoperative, the center of the said brake-actuating shaft and of the second mentioned cam mounted at the end thereof and the central axis of said slidable rod being located on the central axis of said journal member.

2. In an automobile, the combination of an axle having a hollow portion and also having a steering wheel turnably connected thereto by a journal member, a turnable brake-actuating shaft mounted in the hollow portion of said axle, both ends of said brake-actuating shaft projecting through the hollow portion of said axle, brake mechanism associated with said wheel, the brake mechanism for said wheel being connected with the projecting end of said brake shaft adjacent said wheel, operating means connected to the other projecting portion of said brake-actuating shaft, a perforated cover plate for said brake mechanism adapted to enclose the same, the end of said brake-actuating shaft adjacent said wheel projecting through the perforation in said cover plate, the said adjacent end of said brake-actuating shaft having a non-revoluble ball socket connected thereto, said ball socket being forced against a correspondingly shaped member connected to said cover plate by means of an intermediate spring.

In testimony whereof I affix my signature.

FERDINAND PORSCHE.